United States Patent
Aslot et al.

(10) Patent No.: US 9,424,082 B2
(45) Date of Patent: *Aug. 23, 2016

(54) APPLICATION STARTUP PAGE FAULT MANAGEMENT IN A HARDWARE MULTITHREADING ENVIRONMENT

(71) Applicant: International Business Machines Corporation, Armonk, NY (US)

(72) Inventors: Vishal C. Aslot, Austin, TX (US); Adekunle Bello, Austin, TX (US); Gunisha Madan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,126

(22) Filed: Feb. 10, 2016

(65) Prior Publication Data

US 2016/0162413 A1 Jun. 9, 2016

Related U.S. Application Data

(63) Continuation of application No. 14/134,472, filed on Dec. 19, 2013.

(51) Int. Cl.
G06F 9/48 (2006.01)
G06F 12/08 (2016.01)
G06F 9/50 (2006.01)
G06F 11/30 (2006.01)

(52) U.S. Cl.
CPC ............ *G06F 9/4843* (2013.01); *G06F 9/4881* (2013.01); *G06F 9/5038* (2013.01); *G06F 11/30* (2013.01); *G06F 12/0891* (2013.01); *G06F 12/08* (2013.01)

(58) Field of Classification Search
CPC ....... G06F 9/48; G06F 9/4806; G06F 9/4843; G06F 9/4881; G06F 12/08; G06F 11/30
See application file for complete search history.

(56) References Cited

U.S. PATENT DOCUMENTS

| | | |
|---|---|---|
| 7,614,056 B1 | 11/2009 | Saxe et al. |
| 7,698,540 B2 | 4/2010 | Norton |
| 8,479,207 B2 | 7/2013 | Plondke |
| 2010/0082945 A1 | 4/2010 | Adachi et al. |
| 2011/0093638 A1 | 4/2011 | Divirgilio et al. |
| 2011/0145834 A1 | 6/2011 | Damron |
| 2012/0324481 A1 | 12/2012 | Xia et al. |
| 2014/0181825 A1 | 6/2014 | He et al. |

FOREIGN PATENT DOCUMENTS

| | | | |
|---|---|---|---|
| WO | 2007056364 A1 | 5/2007 | |
| WO | 2013135145 A1 | 9/2013 | |

*Primary Examiner* — David X Yi
*Assistant Examiner* — Rocio Del Mar Perez-Velez
(74) *Attorney, Agent, or Firm* — Terrile, Cannatti, Chambers & Holland, LLP; Robert W. Holland

(57) ABSTRACT

A method, system and computer-usable medium are disclosed for startup page fault management improves application startup performance by assigning startup tasks to a hardware thread 0 across plural processing cores in a simultaneous multithreading environment to provide more rapid processing of processor bound page faults. I/O bound page faults are flagged to associated with predetermined cache locations to improve data and text first reference page-in I/O response.

5 Claims, 5 Drawing Sheets

APPLICATION STARTUP PAGE FAULT MANAGEMENT IN A HARDWARE MULTITHREADING ENVIRONMENT

BACKGROUND OF THE INVENTION

1. Field of the Invention

The present invention relates in general to the field of computers and similar technologies, and in particular to software utilized in this field. Still more particularly, it relates to a method, system and computer-usable medium for application startup page fault management in a hardware multithreading environment.

2. Description of the Related Art

A page fault is a trap to software raised by hardware when a program accesses a memory page that is mapped in a virtual memory address space but not loaded in physical memory. Often, page faults are not errors but rather are common and necessary indications to an operating system that the amount of virtual memory available to programs needs to increase. Generally, an operating system handles a page fault by making a required page accessible at a location in physical memory. For example, an exception handling unit of the operating system coordinates with a memory management unit of a processor to load the page in virtual memory, such as by retrieving the page from persistent memory like a hard disk drive.

Page faults are common during application startups as the operating system loads application pages from persistent memory to virtual memory. When large applications startup, a significant portion of startup time is spent in first reference page faults, most of which result from paging data in from a backing storage, such as a file system or database. Many first reference page faults reads that occur during an application startup are the same each time the application starts. For example, software games tend to use the same initial screen shots and user profiles at each startup. As another example, database applications tend to load a common initial set of buffer pools and shared libraries. As applications use larger working sets, such as SGA in a relational database, applications tend to have longer startups, in part due to first reference page faults encountered by startup tasks and processes. Page faults tend to stall applications, especially if there is a page-in from backing store involved. However, first reference page faults on working storage data, such as stack, heap and shared memory, do not always require page-in. For example, some first reference page faults are not I/O bound, but rather are processor bound.

One technique to improve system response to page faults is to use persistent caching of data for applications at runtime. Cached data is maintained in storage having a more rapid response and located closer to the processing node. Such caches are referenced and updated during application runtime so that long running applications that access large amounts of data from backing storage replace cache contents over time, including the contents of initial I/O associated with application startup. Thus, when an application is restarted after a node reboot, the initial I/O cache contents are not typically available for startup operations.

SUMMARY OF THE INVENTION

A method, system and computer-usable medium are disclosed for managed startup tasks optimized with processor and cache resources. Upon detection of an application startup, startup tasks of the application are determined so that software threads of the startup tasks are scheduled to hardware threads 0 across processing cores of a system. First reference page-in I/Os are maintained in cache for more rapid accesses in response to page faults that occur during the startup.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
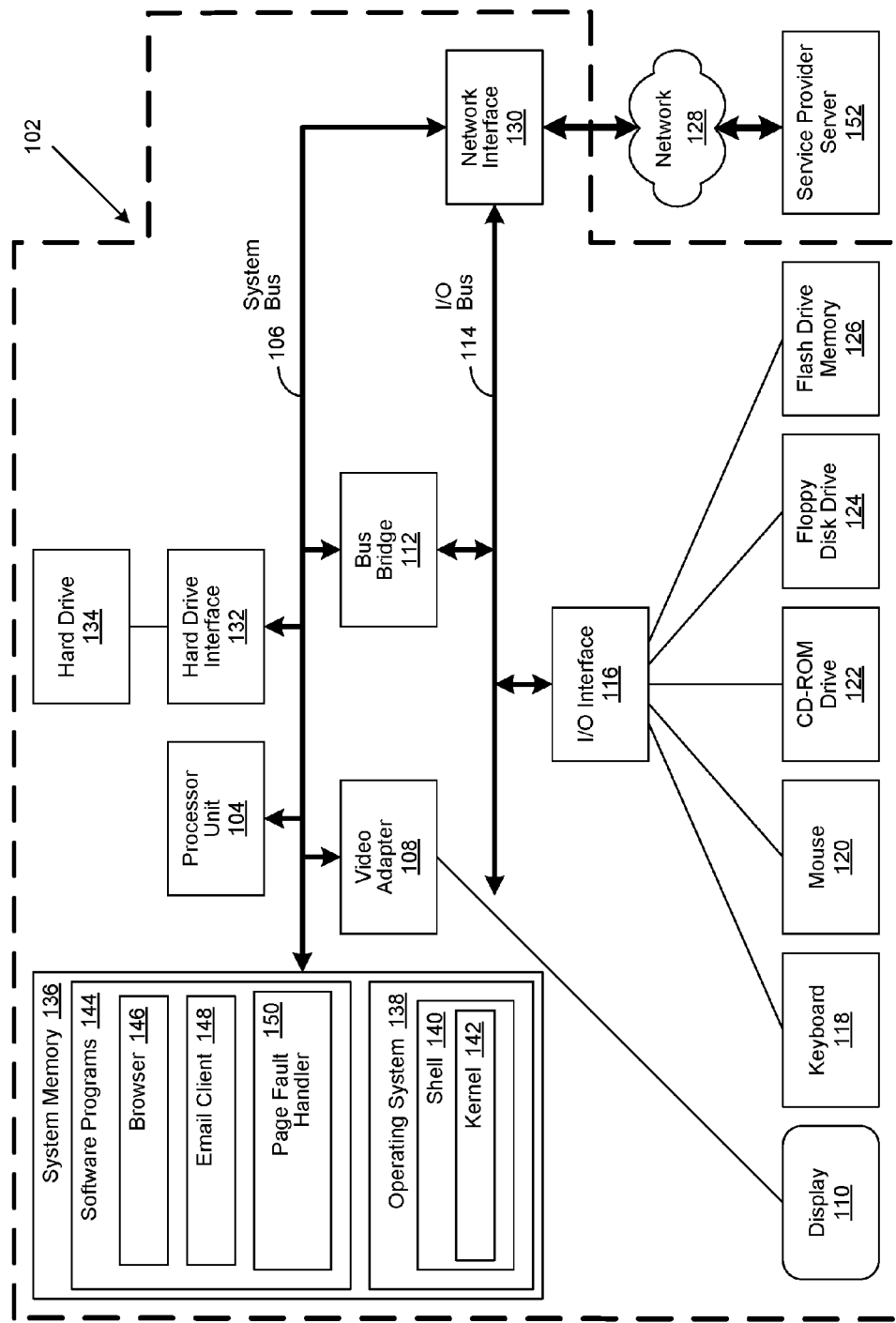
FIG. 1 depicts an exemplary client computer in which the present invention may be implemented.

A method, system and computer-usable medium are disclosed for improved startup response by scheduling startup tasks to a hardware thread 0 through application steady state, and by optimizing page fault response with cache to manage first reference page-ins for application startup tasks.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a page fault handler 150. In these and other embodiments, the page fault handler 150 includes code for implementing the processes described hereinbelow. In one embodiment, client computer 102 is able to download the page fault handler 150 from a service provider server 152.

In a hardware multithreading environment, also known as hyper threading or simultaneous multithreading, the hardware thread 0 (zero) on a processor core tends to run faster than other hardware threads, generally by 20 to 20%. Operating systems typically schedule processor bound tasks on thread 0 and I/O bound tasks on secondary hardware threads of the core. Page fault handler 150 improves application startup by selectively scheduling startup task across plural processor core hardware threads 0 until the application reaches a predetermined steady state. Executing processor bound page faults, such as on working storage data like stack, heap and shared memory, with a thread 0 increases startup performance, especially since most first reference page faults on working storage data require zeroing of the page, an expensive processor operation. Tasks of an application during startup are scheduled to plural thread 0s of plural processor cores by marking an application as subject to startup optimization, detecting application startup, finding all tasks of the application startup, and spreading the tasks across the thread 0s until the application reaches steady state. In addition, page fault handler 150 caches first reference page-in I/Os of the application to reduce page fault response time by making page-in I/Os more rapid.

In one embodiment, page fault handler 150 manages startup page faults without changes made at the applications under management. For example, applications having management of scheduling of thread 0 are identified for optimization using environment variables. In one example embodiment, a variable called SCHED_OPT is used for scheduling optimization and a specialized string value of "USE_THR0" is assigned to the variable while the application starts. The environment variable is picked up at exec( ) time to tell the operating system kernel to monitor all tasks started for the application. The kernel sets a special flag in the ublock indicating that the application is designated for startup optimization. In one alternative embodiment, global tunables are created and called to manage optimization. A similar approach may be used with startup page-in cache management, either separately or in combination with startup thread schedule management. For example, a new environment variable called IO_OPT is used with a string value of "CACHE_INIT_IO" assigned to the variable while the application starts. The environment variable is picked up at exec( ) time to tell the operating system kernel to monitor all tasks started for the application. The kernel sets a special flag in the ublock indicating that the application is designated for startup optimization. In one alternative embodiment, global tunables are created and called to manage optimization.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
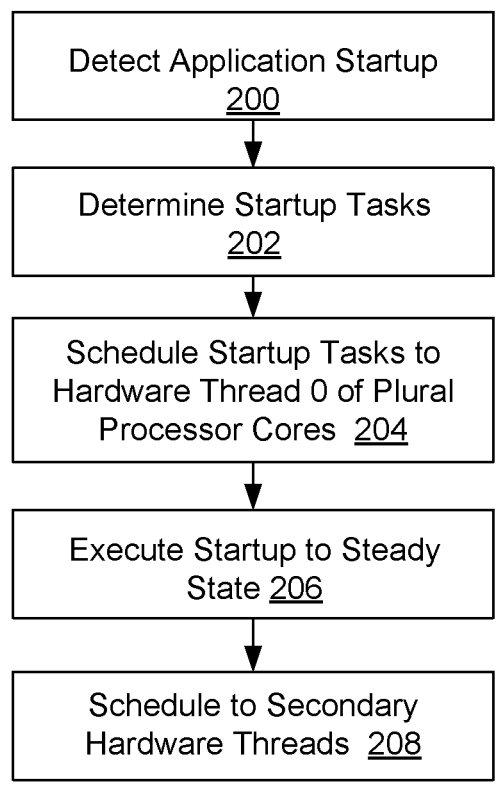
FIG. 2 is a flow diagram of a process for scheduling hardware threads of plural processor cores to application startup tasks.

FIG. 2 is a flow diagram of a process for scheduling hardware threads of plural processor cores to application startup tasks. At step 200, an application startup is detected, such as by the creation of new application tasks or detection by the page fault handler of a first reference page fault. At step 202, tasks associated with the application startup are determined. At step 240, the determined startup tasks are scheduled to hardware thread 0 of plural processing cores. Ideally, each startup task having a software thread is scheduled to its own hardware thread 0 with the startup tasks scheduled across plural processing cores; however, if hardware thread 0s are restricted, some startup threads may share the same processor or may be scheduled to secondary hardware threads that are available. At step 206, the application startup is executed to a steady state as determined by one or more factors, such as the page fault rate for the application compared with other applications, a total number of dispatches, a cache use by the application, or other triggers that indicate startup has completed. Once application startup has achieved a steady state, application tasks may be assigned to other hardware threads besides hardware thread 0.

Figure 3:
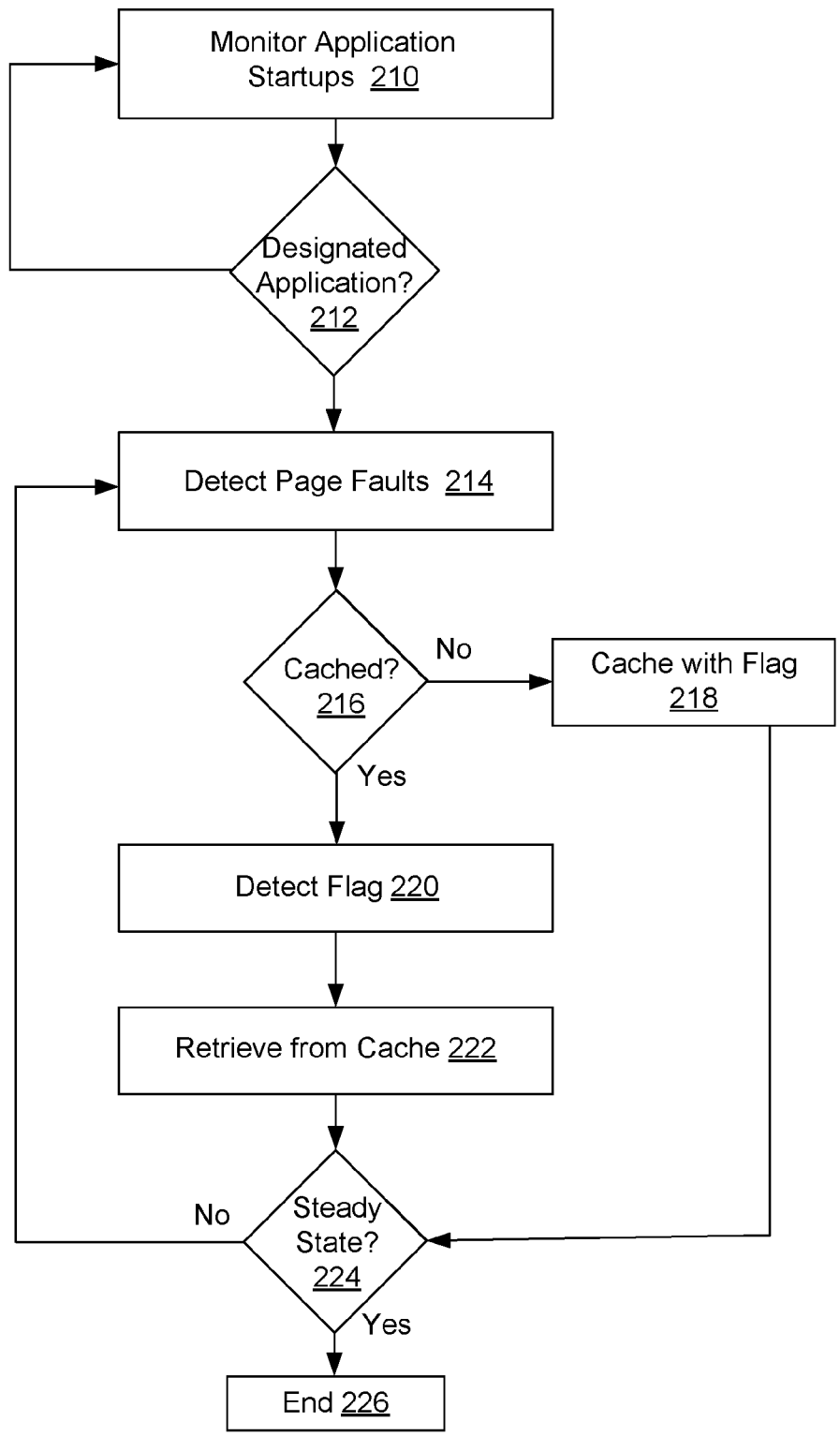
FIG. 3 is a flow diagram of a process for using cached first reference page-in I/Os during application startups.

FIG. 3 is flow diagram of a process for using cached first reference page-in I/Os during application startups. In various embodiments, the hardware thread 0 scheduling of FIG. 2 and the cache scheduling of FIG. 3 may each be used separately and independent of each other or in combination with simultaneous startup management. At step 210, application startups are monitored, such as by detecting new application tasks or first reference page faults. At step 212, a determination is made of whether an application at startup is designated as having optimized startup cache management, such as by checking for a flag associated with optimized startup cache management. If not, the process returns to step 210. If the application is designated for optimized startup cache management, the process continues to step 214 to detect page faults associated with the application startup, such as a first reference page-in I/O faults. At step 216, a determination is made of whether a cache exists to provide a page associated with a startup fault. If not, the process continues to step 218 where the page is retrieved from backing storage, such as a disk drive, and cached in more accessible storage with an appropriate flag, such as in persistent memory locally accessible to the processors running the application startup, if the page is cached at step 216, the process continues to step detect the flag associated with the startup application cache and, at step 222, the page is retrieved from the cache to respond to the page fault. At step 224, a determination is made of whether the application has reached a steady state after the page fault is addressed. If not, the process returns to step 214 to detect the next page fault. If a steady state is reached, the process ends at step 226. In one example embodiment, a steady state is determined based upon the size of the cache used to store initial text and data pages. Once a cached is full, the startup is considered complete.

Figure 4:
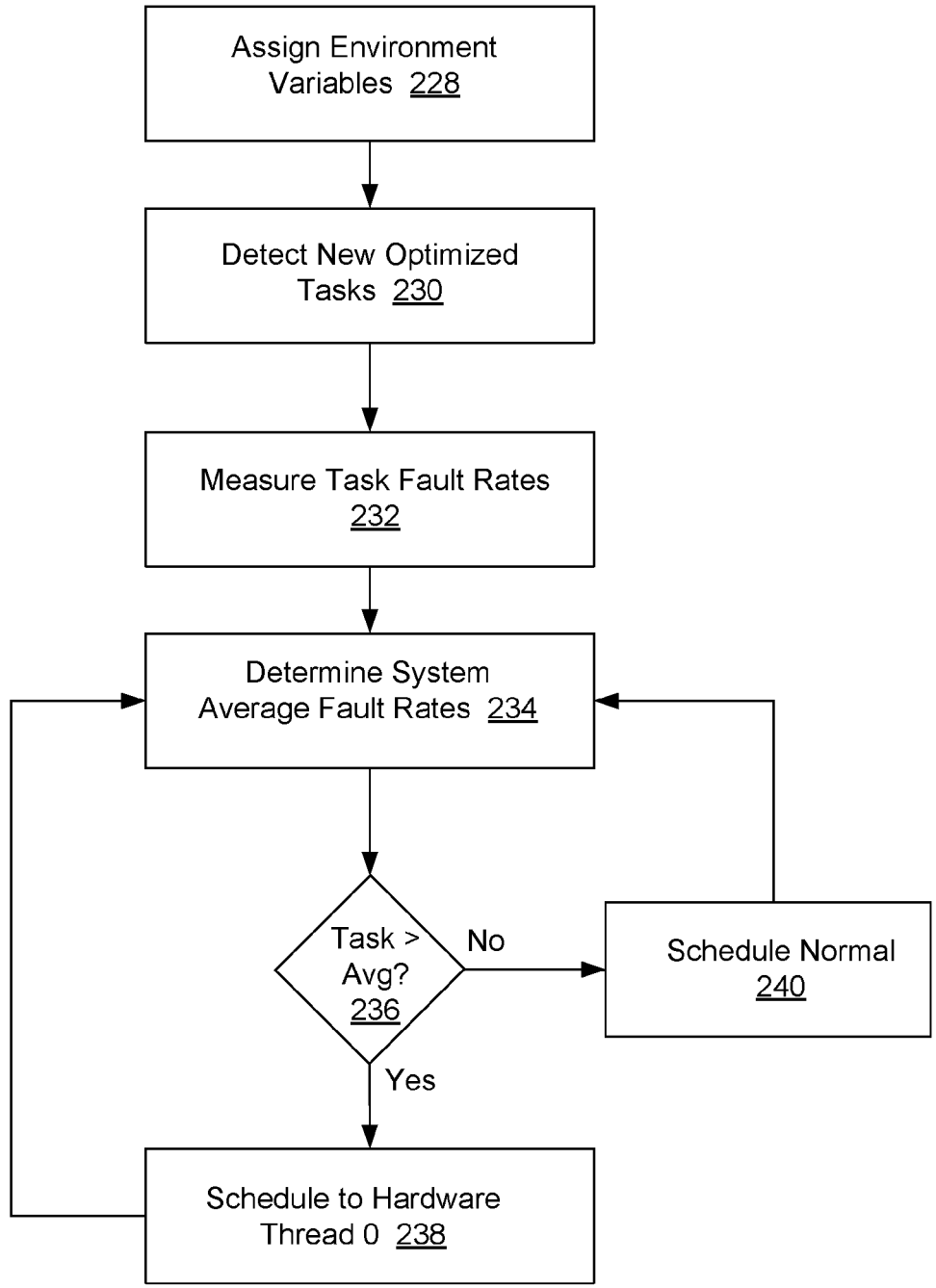
FIG. 4 is a flow diagram of monitoring startup tasks to assign selected startup tasks to hardware thread 0 of plural processor cores.

FIG. 4 is a flow diagram of an example embodiment for monitoring startup tasks to assign selected startup tasks to hardware thread 0 of plural processor cores. At step 228 an environment variable is assigned to one or more applications associated with optimized startup. At step 230, monitoring is performed to detect new tasks having startup by reference to the environment variable. The creation of new tasks, such as application processes and application threads, is detected by monitoring system calls associated with application task creation, such as fork( ), exec( ) and thread_create system calls. New tasks having the environment variable are processed for startup optimization while new tasks that lack the environment variable proceed without optimization. At step 232, new tasks selected for optimization are measured to determine their rate of first reference page fault. The rate of first reference page faults that did not require a page-in from the backing store are measured in order to determine the applications that will receive optimization by hardware thread 0 scheduling. Since the page fault handler is called for first reference page faults, it can determine when a first reference page fault occurs and track how the fault is resolved. An average rate of page faults is determined by the operating system in cooperation with the page fault handler by guaranteeing a first N number of dispatches for the new task on a hardware thread 0 and computing the average rate of page faults based the last M number of dispatches, where M is less than N. In one alternative embodiment, new tasks are also marked with a special Boolean indicating that is scheduled on thread 0, with the Boolean implemented in the uthread or similar structure.

At step 234, a running average of the first reference page fault rates across the system is computed on a periodic basis, such as every minute, and compared with the fault rate of newly started tasks. For example, as new tasks initiate, a first reference page fault rate is determined every second or ten seconds to compare with system average rates to provide a basis for comparison of newly started tasks and other tasks at the system. At step 236, a determination is made for each newly started task of whether the newly started task has a first reference page fault rate of greater than the system average rate. For example, at each dispatch after the first N dispatches, if the average first reference page fault rate of a task is equal or higher than the system average, the task associated with the greater rate is assigned to hardware thread 0. In alternative embodiments, the comparison of average versus per task fault rates might have a bias based upon system utilization, such as by limiting scheduling of a new task to hardware thread 0 only if the fault rate of the new task is some factor greater than the average fault rate. At step 236, a determination is made of whether a newly created task has greater than the average fault rate. If yes, the process continues to step 238 to schedule the tasks of the associated application startup to a hardware thread 0, and then the process returns to step 234 to continue monitoring of other task fault rates. If at step 236 the determination is no, the process continues to step 240 to schedule the task across secondary hardware threads and then continues to step 234 to continue monitoring. In one alternative embodiment, tasks may be scheduled on a hardware thread 0 with special system calls. For example, a shmget( ) with SHM_PIN flag is used to indicate that an application has attempted to pin a large shared memory area so that tasks of the application can be moved to a hardware thread 0 since pinning the area would first require reference page faults without page-in from the backing store but with zeroing of pages. Similarly, an mlock( ) system call that indicates pinning of a large amount of memory typically including mmap'ed regions may be used to initiate a hardware thread 0 scheduling where the region is "anonymous" mmap and not files since the task making the call indicates that first reference page faults will occur.

Figure 5:
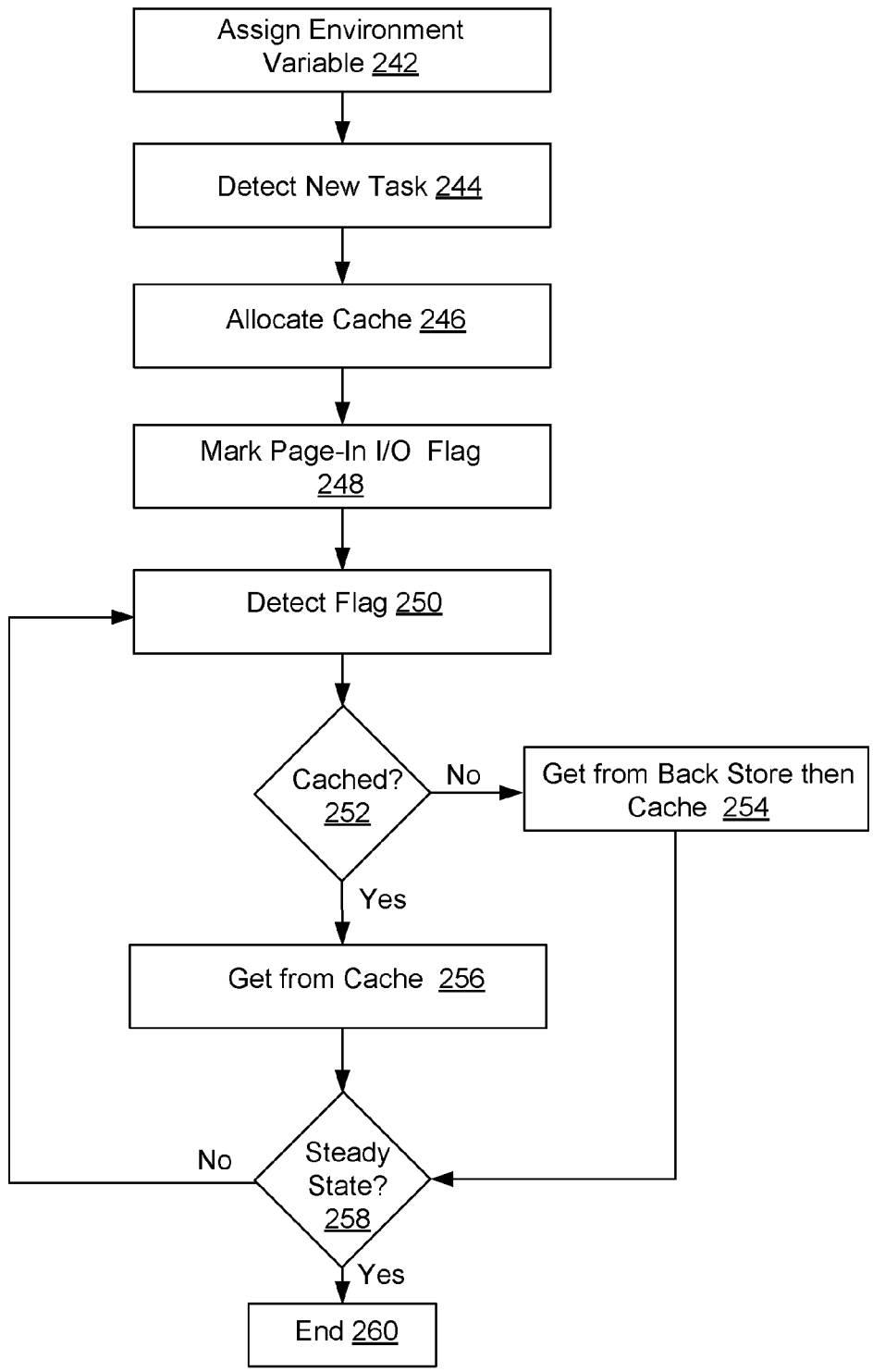
FIG. 5 is a flow diagram of monitoring startup tasks to assign selected startup tasks to cached first reference page-in I/Os.

FIG. 5 is a flow diagram of monitoring startup tasks to assign selected startup tasks to cached first reference page-in I/Os. When used alone or in combination with hardware thread 0 scheduling, first reference page-in caches provide persistent storage of first reference page-ins during an application start for use in subsequent application starts. First reference page-in caches provide more rapid startups where retrieval to the application from cache occurs more quickly than retrieval from backing storage, such as by using flash memory local to the processor instead of a backing storage disk drive. In one embodiment, blocks on a disk for first reference I/O pages may be organized so that even retrieval from backing storage occurs more quickly, such as by having fewer I/Os and disk rotations during application startup. A disk or flash blocks may be partitioned so that qualifying applications have dedicated cached that is not overwritten after startup and, allows tracking of first reference I/O pages for each application in order of priority to application startup based upon available cache size.

At step 242, an environment variable is assigned to applications that are designated to receive optimized startup by first reference page-in cache management. At step 244, a new task startup is detected that indicates a flagged application startup. New application tasks are detected by monitoring for fork( ), exec( ), thread_create( ) or similar system calls. In addition, the page fault handler knows which page faults are first reference faults resulting in I/O because the page fault handler is, by definition, invoked for first reference page faults. At step 246, cache is allocated to the application startup tasks. For example, a system administrator allocates a desired number of blocks of memory on faster storage devices, such as flash devices or consecutive blocks on a fast disk. At step 248, the page fault handler marks each page-in I/O buffer with a special flag that a pager strategy routine can understand as designating the task for optimized cache treatment. The pager strategy routine drives a page-in from the cache are first if one is available or, if the data is not available, retrieves the data from backing storage. For example, at step 250, the special flag is detected and, at step 252, a determination is made of whether the page I/O is cached. If not, the process continues to step 254 to get the data from backing storage and to cache the data for future accesses. If the data is cached at step 252, the process continues to step 256 to get the page from the cache and then to step 258 to determine if the application is in startup or has reached a steady state. For example, a steady state is determined based on a variety of factors, such as the size of cache that stores initial text and data pages so that a steady state is found if the cache is full. As another example, the steady state is found if a predetermined cached data is retrieved by the application, which indicates that the application has reached a predetermined state. If a steady state is not found, the process returns to step 250 to continue monitoring for task. If a steady state is found at step 258, the process ends at step 260 for the application.

At step 254, if data comes from a backing store, the page fault handler initiates a page out of the data to the cache area if space permits. The page fault handler is responsible for managing blocks on the cache as well as for maintaining coherency between the backing store and the cache for modified blocks of data. The page fault handler stops writing to the cache once the cache is full, however, cached data may be maintained based upon the priority of the applications associated with the cached data. Cache block replacement on subsequent startups is managed by maintaining a reference bit for each cache block. On each startup of the page fault handler, reference bits are cleared, such as on the first I/O to the cache. Reference bits have persistence and performance by being maintained in the cache itself, such as by having its own block in cache. The page fault handler sets reference bits as it finds blocks in the cache on the first reference fault. The page fault handler replaces blocks that lack recent references, such as with a randomized algorithm on hashed buckets of blocks so that blocks that are about to be read are not replaced. In one embodiment, the operating system provides tools to report efficiency of optimization to cache. In another embodiment, a system administrator is provided with commands to manage the cache explicitly, such as by invalidating the entire cache such that it gets rebuilt on subsequent startup.

Although the present invention has been described in detail, it should be understood that various changes, substitutions and alterations can be made hereto without departing from the spirit and scope of the invention as defined by the appended claims.

What is claimed is:

1. A computer-implemented method for application startup page fault management comprising:
   detecting of an application startup for an application designated to receive the application startup page fault management;
   determining plural tasks associated with the startup of the application;
   scheduling the plural tasks to a hardware thread 0 of each of plural processor cores; executing application startup to a predetermined steady state, wherein the predetermined steady state comprises at least a predetermined number of dispatches of each of the plural tasks on their respective thread 0; and
   responsive to the predetermined steady state, scheduling tasks associated with the application to hardware threads in addition to thread 0.

2. The method of claim 1, further comprising:
   caching plural first reference page-in I/Os of the application in a predetermined cache in association with a flag;
   detecting a first reference page-in I/O flag during the executing application startup; and
   in response to detecting, retrieving the first reference page-in I/O from the predetermined cache.

3. The method of claim 2, wherein caching plural first reference page-in I/Os of the application further comprises:
   monitoring startup of the application to detect page faults; and
   in response to detecting a page fault, caching the page-in I/O of the fault in association with the first reference page-in I/O flag.

4. The method of claim 3, wherein the predetermined steady state comprises retrieval of predetermined cached first reference page-in I/Os.

5. The method of claim 1, wherein detecting of an application startup for an application designated to receive the application startup page fault management further comprises detecting one of a fork, exec, or thread_create system calls.

* * * * *